United States Patent
Svanbro et al.

(10) Patent No.: US 6,556,587 B1
(45) Date of Patent: Apr. 29, 2003

(54) UPDATE OF HEADER COMPRESSION STATE IN PACKET COMMUNICATIONS

(75) Inventors: Krister Svanbro, Luleå (SE); Jim Sundqvist, Luleå (SE); Lars Westberg, Enköping (SE)

(73) Assignee: Telefonaktiebolaget LM Ericsson (publ) (SE)

(*) Notice: Subject to any disclaimer, the term of this patent is extended or adjusted under 35 U.S.C. 154(b) by 0 days.

(21) Appl. No.: 09/257,687

(22) Filed: Feb. 26, 1999

(51) Int. Cl.[7] .................................................. H04Q 7/20
(52) U.S. Cl. ........................ 370/471; 370/465; 370/474
(58) Field of Search ........................ 370/349, 352–356, 370/389, 392, 393, 394, 395.1, 395.52, 470, 471, 472, 473, 474, 493, 494, 495, 465, 468, 522, 528, 336, 337, 345, 347, 328, 329

(56) References Cited

U.S. PATENT DOCUMENTS

| | | | | |
|---|---|---|---|---|
| 4,939,721 A | * | 7/1990 | De Bosio | 359/117 |
| 5,008,882 A | * | 4/1991 | Peterson et al. | 370/406 |
| 5,121,385 A | * | 6/1992 | Tominaga et al. | 370/435 |
| 5,233,607 A | * | 8/1993 | Barwig et al. | 370/397 |
| 5,519,704 A | * | 5/1996 | Farinacci et al. | 370/402 |
| 5,621,733 A | * | 4/1997 | Rooth | 370/392 |
| 5,701,302 A | * | 12/1997 | Geiger | 341/106 |
| 5,883,890 A | * | 3/1999 | Okanoue et al. | 370/338 |
| 5,889,770 A | * | 3/1999 | Jokiaho et al. | 370/337 |
| 5,923,655 A | * | 7/1999 | Veschi et al. | 370/394 |
| 6,023,458 A | * | 2/2000 | Tweedy et al. | 370/328 |
| 6,032,197 A | * | 2/2000 | Birdwell et al. | 709/247 |
| 6,101,189 A | * | 8/2000 | Tsuruoka | 370/392 |
| 6,138,019 A | * | 10/2000 | Trompower et al. | 455/432 |
| 6,151,333 A | * | 11/2000 | Arimilli et al. | 370/468 |
| 6,363,056 B1 | * | 3/2002 | Beigi et al. | 370/252 |

FOREIGN PATENT DOCUMENTS

| | | | | |
|---|---|---|---|---|
| GB | 2 294 610 A | 5/1996 | | |
| WO | 9748212 | 12/1997 | ........... | H04L/12/56 |

OTHER PUBLICATIONS

Casner et al., "Compressing IP/UDP/RTP Headers for Low–Speed Serial Links," Internet Engineering Task Force, Jul. 27, 1998, pp. 1–22.

Perkins et al., "Dependency Removal For Transport Protocol Header Compression Over Noisy Channels," IEEE International Conference on Communications, New York, Jun. 1997, pp. 1025–1029.

* cited by examiner

*Primary Examiner*—Dwayne Bost
*Assistant Examiner*—Jean A Gelin
(74) *Attorney, Agent, or Firm*—Jenkens & Gilchrist, A Professional Corporation (57) ABSTRACT

The soft state of a header compression scheme in a communication system carrying packet traffic including a real time communication signal can be updated during periods of communication signal inactivity, during which there is no need to transmit the communication signal. The header compression soft state can also be updated by stealing bits from the communication signal to carry the header update information. If the communication signal includes source encoded data, the header compression soft state can be updated selectively based on the bit rate of a codec that produced the source encoded data.

35 Claims, 7 Drawing Sheets

_UPDATE OF HEADER COMPRESSION STATE IN PACKET COMMUNICATIONS_

FIELD OF THE INVENTION

The invention relates generally to packet communications and, more particularly, to header compression in packet communications.

BACKGROUND OF THE INVENTION

The term header compression (HC) refers to the art of minimizing the necessary bandwidth for information carried in packet headers on a per hop basis over point-to-point links. Header compression is usually realized by sending static information only initially. Semi-static information is then transferred by sending only the change from the previous header and completely random information can be sent without compression. Hence, header compression is usually realized with a state machine.

Figure 1:
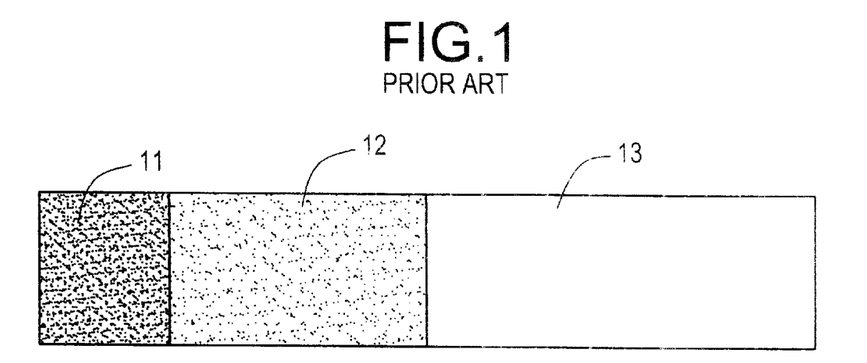
FIG. 1 illustrates an exemplary packet format which can be used in conjunction with the present invention.
Figure 1A:
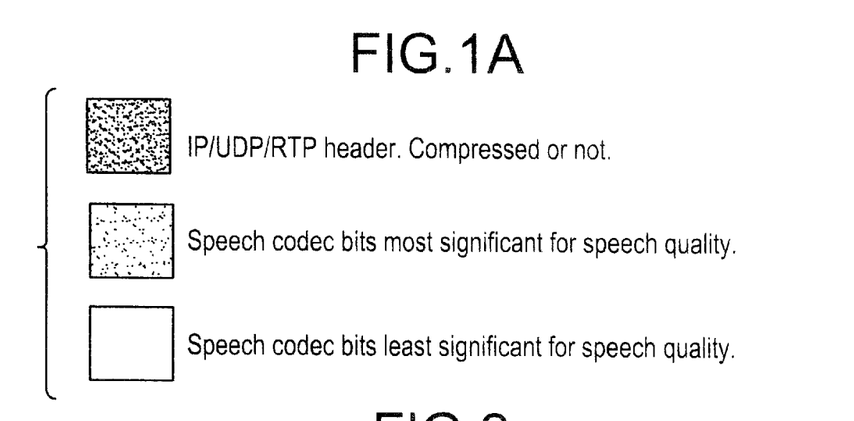
FIG. 1A is a shading key for use with FIG. 1.

A conventional VoIP-packet (Voice over IP) consists basically of three parts with different quality requirements, as shown in FIG. 1. The three parts are:

(1) a compressed or not compressed header 11. For example, for real-time speech a conventional IP/UDP/RTP header is often used;

(2) the speech codec bits at part 12, which are most significant for the speech quality. In, for example, the GSM full rate speech codec there are three classes of bits: 1A, 1B and 2, where class 1A and class 2 speech codec bits are respectively most and least important for the speech quality; and (3) the speech codec bits at part 13 are least important for the speech quality, for example, class 2 bits in GSM.

A conventional header compression scheme for IP/UDP/RTP typically has a soft state characteristic such that the state of the HC may depend on previous headers. An error in a compressed header may result in a loss of the corresponding packet. Because each header usually is represented as a change from the previous header (delta-coding), an error in a compressed header is a faulty state that will cause successive packets to be lost until the HC soft state is updated. If the payload for the packets with the compressed headers carries a real time service, the loss of several successive packets may be disastrous for the quality of that real time service. For example, the quality of a real time speech service will degrade substantially with successive lost speech is frames. If the speech frame error rate has a bursty characteristic, the speech quality will be worse than for the same speech frame error ratio but with a less correlated frame error characteristic.

The effects of bit errors may be different depending on where in the VoIP-packet the bit errors occur:

(1) Bit errors in part 13 of FIG. 1 (the least important speech codec bits) will result in a slightly degraded quality for the speech carried by that specific packet.

(2) Bit errors in part 12 of FIG. 1 (the most important speech codec bits) may result in a speech quality degradation so severe that the packet is judged as useless and will not be used in the speech decoder. Hence, that specific packet may be lost due to bit errors in part 12 of the packet.

(3) Bit errors in part 11 of FIG. 1 (the header, compressed or not) will probably result in the loss of that specific packet since it cannot be transferred to the upper layers of the protocol stack. Further, it can also result in a number of successive lost future packets since the header compression soft state is now corrupt. These are the most severe errors because bit errors in one packet may result in the loss of a number of successive packets.

The conventional header compression algorithms are made for narrow band, wired channels, wherein the error rate of the channel is rather stationary and small. Further, the usage of the channel does not affect other users with similar channels. This is not the case for a wireless channel. The quality of a wireless channel may change rapidly and the usage of the channel affects other users in terms of interference. In a header compression scheme for a wireless channel the probability for errors in the compressed headers will be large and the effect of these compressed header errors has to be reduced.

There are two general approaches to avoid this problem, either minimize the time it takes to update the HC soft state, or minimize the probability for bit errors in compressed headers.

One known way of updating the HC soft state is to send full headers regularly and frequently. For example, a full header can be sent in every fifth speech packet while sending compressed headers in the other packets. If a channel with a fixed bit rate is to be used, the bit rate of this channel is typically chosen with respect to the largest packet size since delay variations are not desirable. Hence, the bit rate of the channel is chosen according to a packet with a full header, resulting in a waste of resources (e.g., radio resources). Further, to achieve robustness in such a header compression scheme, the frequency of full headers must be rather large, which decreases the compression grade and efficiency of the header compression scheme. Hence, regular updates of header compression state with full headers will either result in inefficient header compression or efficient header compression without the necessary robustness against e.g., bit errors.

Another way to update the header compression soft state is for the header compression scheme to demand a soft state update whenever necessary. However, this approach requires a duplex channel with a short round trip time in order to keep the corrupt soft state periods small. Further, such a scheme also requires that the back channel carrying the soft state update request is generally reliable.

It is desirable in view of the foregoing to provide for updating the soft state of a header compression scheme while avoiding the aforementioned disadvantages of prior art approaches.

The present invention provides for updating the soft state of a header compression scheme in a communication system carrying packet traffic including a real time communication signal. The header compression state can be updated during periods when the communication signal is inactive. Also, the invention provides for updating the header compression state by stealing bits from the communication signal to carry the header update information. If the communication signal includes source encoded data, the invention provides for updating the header compression state selectively based on the bit rate of a codec that produced the source encoded data. This operation can permit header compression state updating without stealing any of the source encoded data.

DETAILED DESCRIPTION

Figure 2:
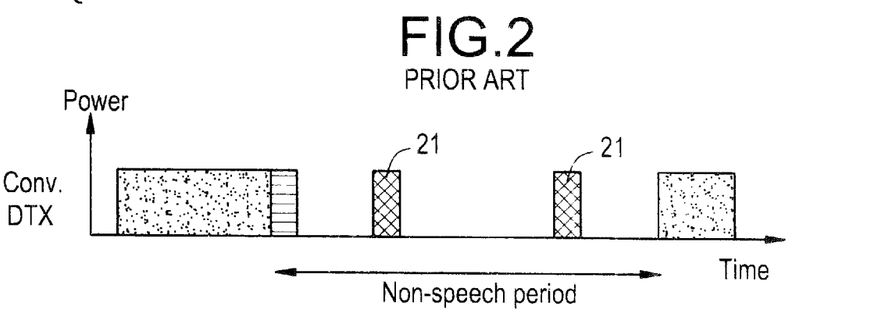
FIGS. 2 and 3 illustrate diagrammatically examples of DTX (Discontinuous Transmission) schemes implemented by conventional speech codecs.
Figure 3:
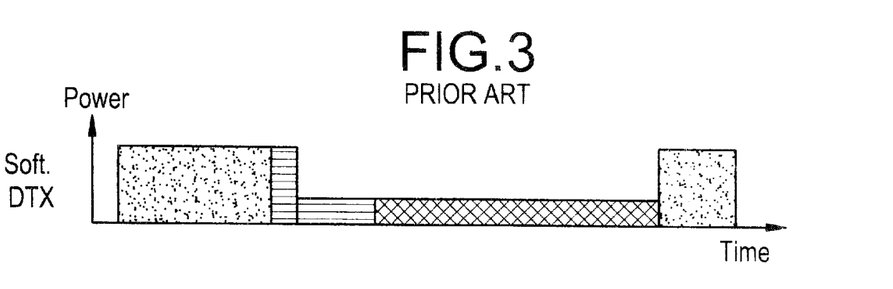

Example embodiments of the invention are cooperable with DTX techniques used in most conventional digital speech services. DTX (Discontinuous Transmission) comprises techniques for detecting non-speech (silent) periods and sending only silence descriptors (SID frames) during these periods in order to produce comfort noise at the receiving end. This comfort noise provides the illusion of continuous transmission of sound. Thus, during non-speech periods, the transmitted packets have a format similar to that shown in FIG. 1, except the payload portion (at 12 and 13) includes a SID frame. FIGS. 2 and 3 show conventional DTX schemes, namely the original DTX (FIG. 2) and the so-called soft DTX (FIG. 3).

Figure 4:
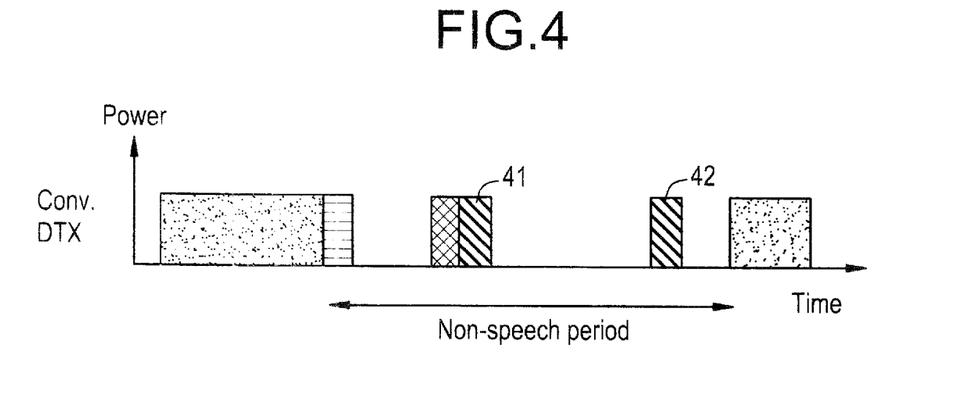
FIGS. 4 and 5 illustrate exemplary manners in which the present invention can utilize the conventional DTX operations of FIGS. 2 and 3 to transmit header compression soft state update information.
Figure 5:
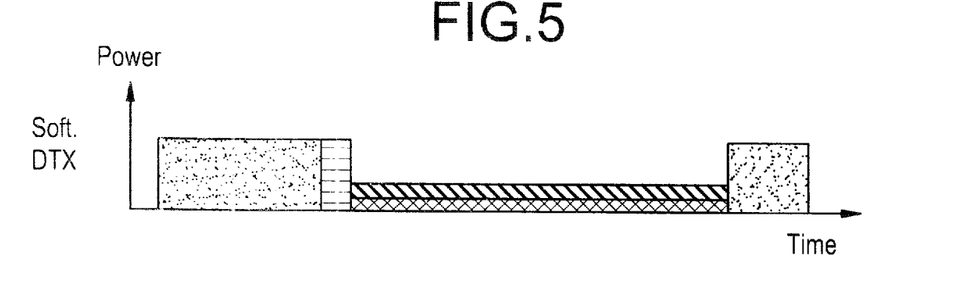
Figure 5A:
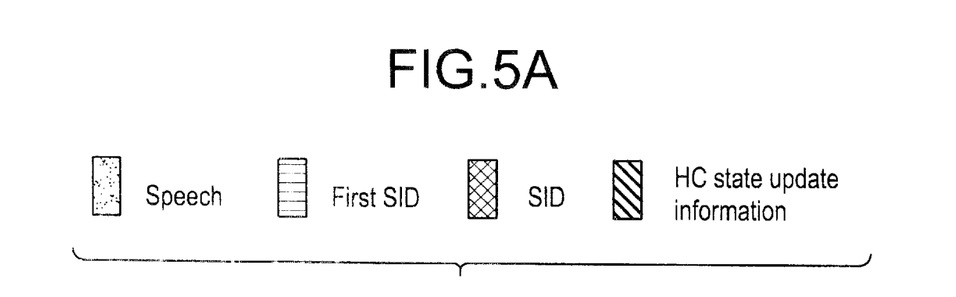
FIG. 5A is a shading key for use with FIGS. 2–5.

According to an exemplary embodiment of the present invention, header update information can be added to a SID frame of FIG. 2 or can replace a SID frame of FIG. 2. In GSM for example, SID frames (see 21 in FIG. 2) are transmitted regularly during silent periods (once every 0.48 seconds). The desired update of the header compression state may be accomplished by sending the header update information, for example a full header, together with (see 41) or instead of (see 42) a SID frame, as seen in FIGS. 2 and 4. In another embodiment, the update of header compression state is achieved in conjunction with the conventional soft DTX technique (as described in "Continuous and Dis-Continuous Power Reduced Transmission of Speech Inactivity for the GSM System", Stefan Bruhn et al., Globe-Com 98) illustrated in FIG. 3. The soft DTX technique makes it possible to realize during non-speech periods a low bit rate stream of SID frames 31 which does not introduce much interference to other links. Hence, soft DTX could be used to carry header update information during non-speech periods, as shown in FIG. 5.

Figure 6:
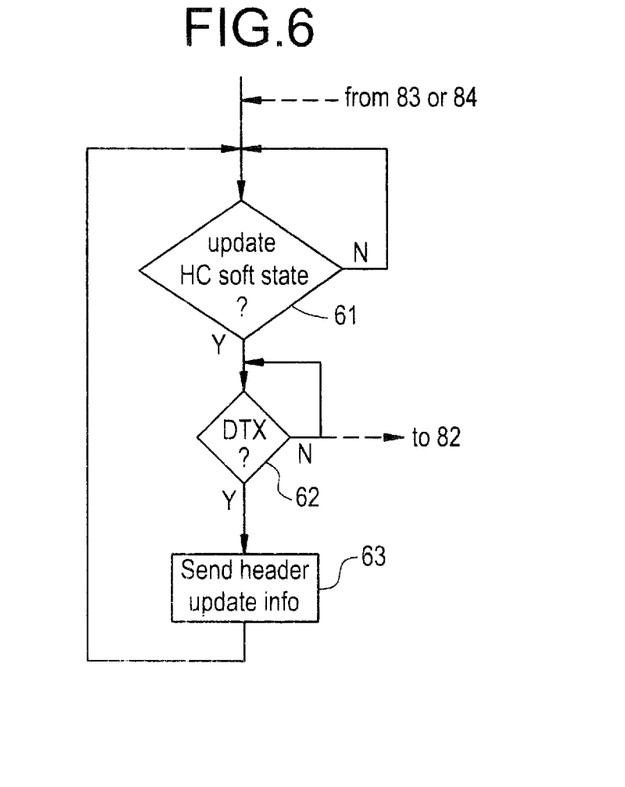
FIG. 6 illustrates exemplary operations associated with the header compression update schemes illustrated in FIGS. 4 and 5.

One example of the above-described use of DTX to provide HC soft state updates is shown in FIG. 6. When an update is desired at 61, it is determined at 62 whether DTX operation is occurring. If so, then the header update information is sent at 63, either in addition to the SID frames (see FIG. 5 and 41 of FIG. 4) or instead of a SID frame (see 42 in FIG. 4).

In conventional video encoding, the transmitting station outputs a sequence of frames that each include, for example, information indicative of a difference between a current captured image and the image captured immediately before the current image. Thus, during periods when the image seen at the transmitting station does not change, the transmitting station sends "static image" frames which indicate that the current image does not differ (or at least does not differ beyond a predetermined limit) from the immediately preceding image. These "static image" frames are thus generally analogous to the aforementioned SID frames, in that they are associated with periods of "static video" wherein no (or no substantial) image change occurs. Accordingly, the techniques described above with respect to FIGS. 2–6 are also applicable to video packet embodiments, the header update information being sent either in addition to the "static image" frames, or instead of a "static image" frame during a period of "static video".

Further exemplary embodiments of the invention replace packet payload bits, e.g., speech frame bits, video frame bits or payload bits representing any desired information, with header compression state update information. If the header compression state is corrupt (e.g., due to bit errors in previous compressed headers) the payload bits (see e.g., 12 and 13 in FIG. 1) will not be delivered to the application layer until the header compression state is restored. Hence, until the header compression state is restored, the payload bits are useless anyway. Using speech frames as a payload example, by replacing some part of the speech data with header compression update information, immediate future speech frames may be delivered to the application layer. Parts of a speech frame or the whole speech frame may be replaced with header update information. This replacement of payload bits is also referred to herein as "bit stealing", because payload bits are "stolen" and used instead to carry header update information.

Figure 7:
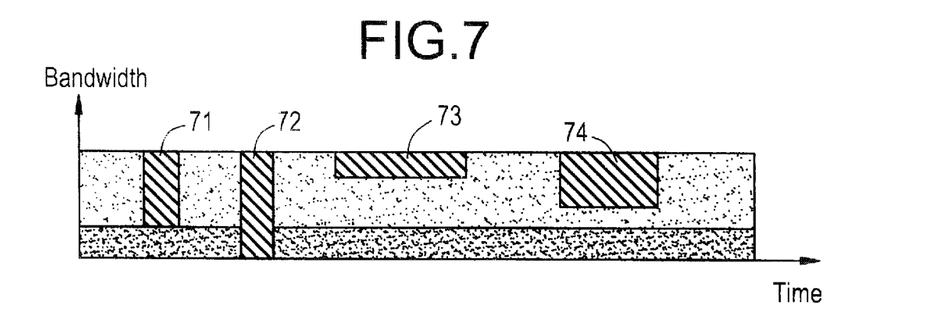
FIG. 7 illustrates diagrammatically examples of bit stealing operations performed according to the present invention to permit header compression soft state updates.
Figure 7A:
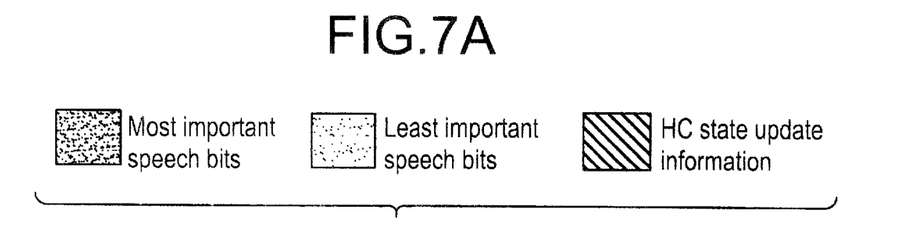
FIG. 7A is a shading key for use with FIG. 7.

When deciding which speech frame bits to replace with header update information, the characteristics of the speech codec can be taken into consideration. Most conventional speech codecs classify their output bits by relative importance. For example, as mentioned above, the GSM full rate speech codec has three classes of bits with different importance: class 1A, 1B and class 2. Class 1A bits are most important and class 2 bits are least important. Thus, header update information bits would preferably replace class 2 bits where available, because these bits are the least important for the resulting speech quality. FIG. 7 shows examples of how this can be accomplished.

At 71 in FIG. 7, all bits except the most important bits are stolen, and all bits are stolen at 72. Considering the updates shown at 73 and 74, fewer bits are stolen for a longer time at 73, while more bits are stolen for a shorter time at 74.

Although the inventive bit stealing techniques of selecting among bits of varying levels of importance are described above with respect to the example of a speech codec that classifies its output bits by relative importance, these bit stealing techniques are applicable to any type of codec that classifies its output bits by relative importance. A video codec is also exemplary of this type of codec.

In embodiments wherein the payload includes source encoded data, the header compression soft state can be updated in conjunction with variations of the bit rate of a codec that produced the source encoded data, and without stealing any of the source encoded data bits. For example, a conventional codec such as a speech or video codec, typically lowers its bit rate for two exemplary reasons: (1) the codec may adapt its bit rate to channel conditions (so-called channel adaptive mode), lowering the bit rate when the channel is congested; and (2) the codec may adapt its bit rate to the behavior of the source (so-called source adaptive mode), lowering its bit rate when the source (for example a speech source or a video source) produces less source stimulus information (i.e., more periods of silence or "static video"). The lowered bit rate in source adaptive mode is advantageous for sending header update information because less bits are used to represent the source stimulus, leaving more bits to be used for header update information.

Figure 13:
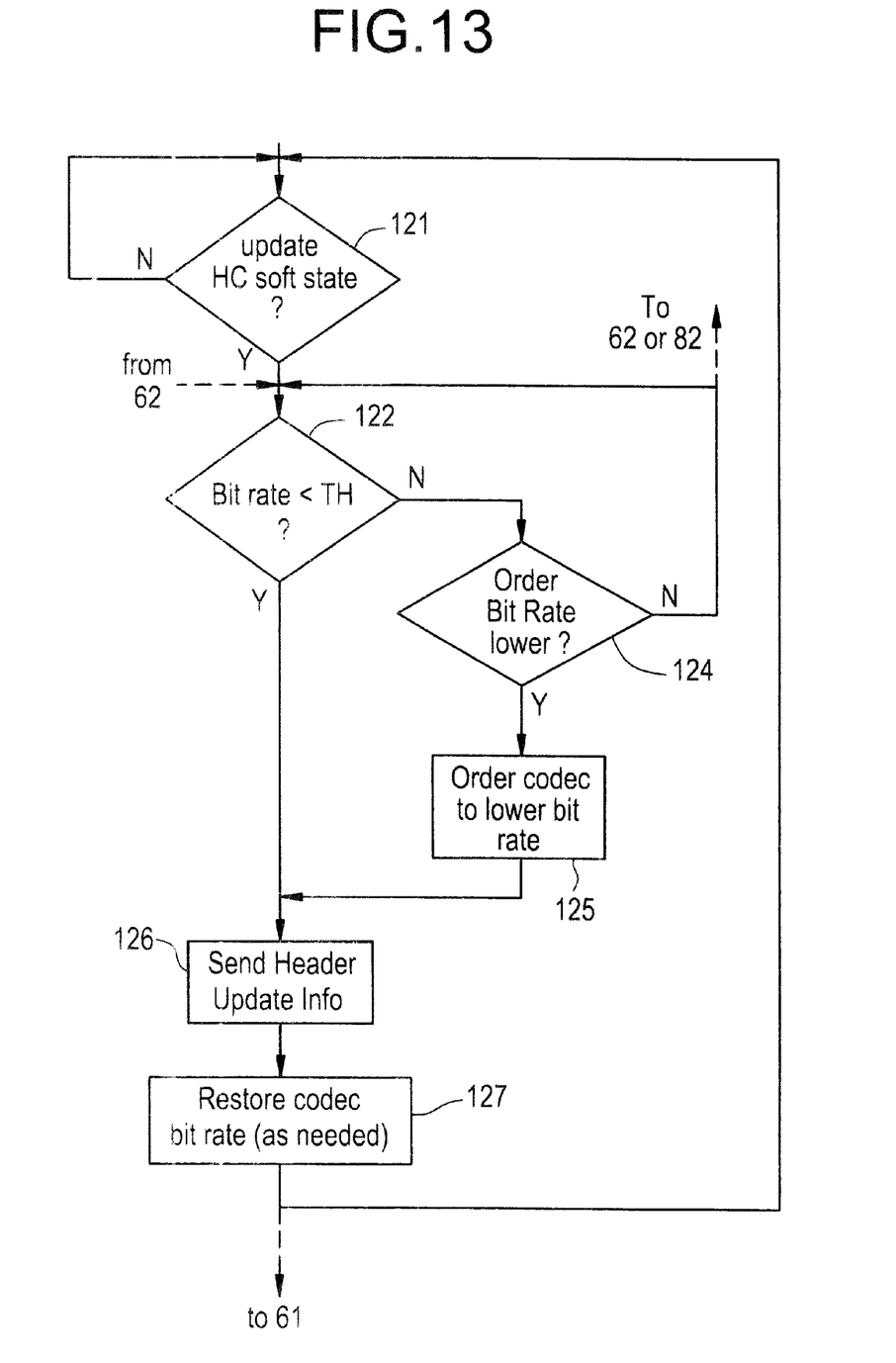
FIG. 13 illustrates exemplary operations that can be performed in support of HC soft update according to the invention when the packet payload information includes source encoded data.

FIG. 13 illustrates exemplary operations that can be performed to implement the above-described use of a lowered codec bit rate to facilitate header compression soft state updates in source encoded data packet embodiments, for example speech or video packet embodiments. When an HC soft state update is desired at 121, it is thereafter determined at 122 whether the codec bit rate is below a threshold level TH. The threshold level TH can be determined empirically to provide desired performance. If the codec bit rate is below TH at 122, then header update information can be sent at 126 in a packet along with the source encoded data.

If at 122 the codec bit rate is not below TH, then it can be determined at 124 whether or not to order the codec to lower its bit rate below TH. If so, then the codec is ordered at 125 to lower its bit rate below TH, and the header update information can be sent at 126 in a packet along with the source encoded data. In embodiments where the codec is not to be ordered to lower its bit rate, operation can flow from 124 back to 122.

After header update information is sent at 126, the codec bit rate can be restored at 127 as needed (i.e., if it was lowered at 125).

The invention also provides for partially updating the header compression state. For example, it may be decided to update only one field (or a few fields) in the header at a given time. As a specific example, if a given speech frame does not have enough bits available for stealing to permit a complete header state update, then perhaps only the RTP sequence number of the RTP portion of an IP/UDP/RTP header would be updated in that speech frame. The use of fewer bits to send partial update information can, in some cases, provide a sufficient HC soft state update but can, in other cases, cause completion of the desired update to take more time (see e.g., 73 in FIG. 7).

Figure 8:
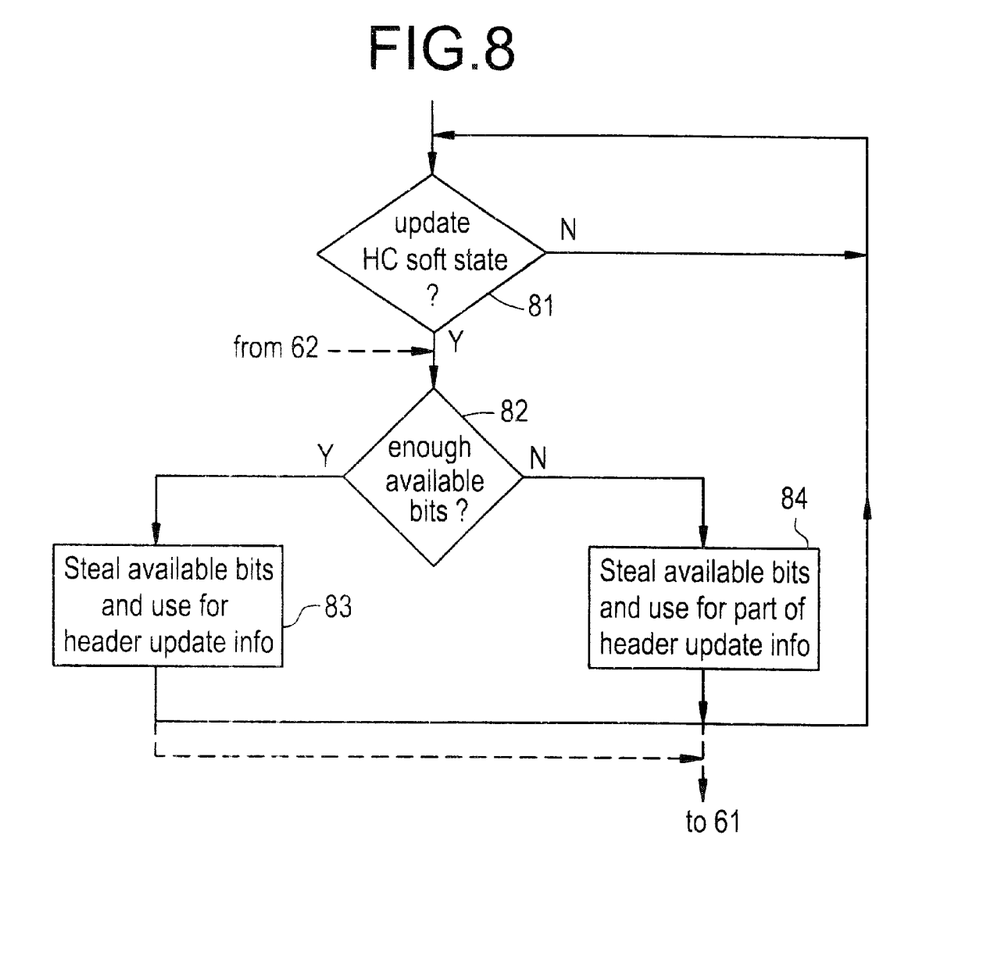
FIG. 8 illustrates exemplary operations associated with the bit stealing scheme of FIG. 7.

FIG. 8 illustrates exemplary operations that can be performed to implement a bit stealing scheme according to the invention. If an update is desired at 81, it is determined at 82 whether enough bits are available to be stolen and used to send the complete header update information. If so, then at 83 the bits are stolen and used to send the complete header update information. If there are not enough bits available at 82, for example, not enough GSM class 2 speech bits, or not enough payload bits in total, then at 84 the available bits are stolen and used to send part of the header update information.

As shown by broken lines in FIGS. 6, 8 and 13, the respective operations shown therein can be variously combined. For example, in speech or video embodiments, if an update is desired in FIG. 6, but DTX (or "static video") operation is not occurring at 62, then either the bit stealing operations of FIG. 8 or the codec-related operations of FIG. 13 can be performed. As another example, if the operations of FIG. 13 do not result in sending header update information, then either the bit stealing operations of FIG. 8 or the DTX/"static video" operations of FIG. 6 can be performed. The decision of whether an update is desired (see 61, 81 and 121) can be made using conventional criteria.

Figure 9:
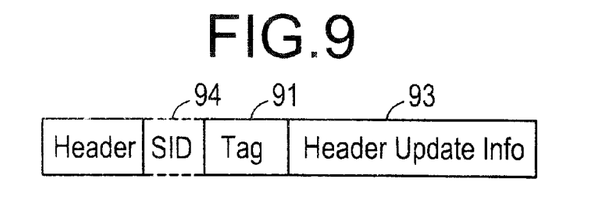
FIG. 9 illustrates an exemplary packet which can be used in conjunction with the DTX update schemes of FIGS. 4 and 5.

Referring again to the DTX/"static video" update techniques of FIGS. 4 and 5, an example of a packet containing the update information sent during the non-speech/"static video" period is shown in FIG. 9. The exemplary packet of FIG. 9 includes a conventional header (compressed or not), a soft state update tag 91, and a header update information portion 93. The soft state update tag 91 makes it possible for a communication station that receives the packet of FIG. 9 to recognize that the packet includes header update information 93, whereby the receiving communication station will not mistake the FIG. 9 packet for a conventional speech (or video) packet or a conventional SID (or "static image") frame packet. As shown in broken lines at 94 in FIG. 9, the header update information 93 and tag 91 can also be included in a packet with a SID (or "static image")frame, as discussed above with respect to FIG. 5 and 41 of FIG. 4.

Figure 10:
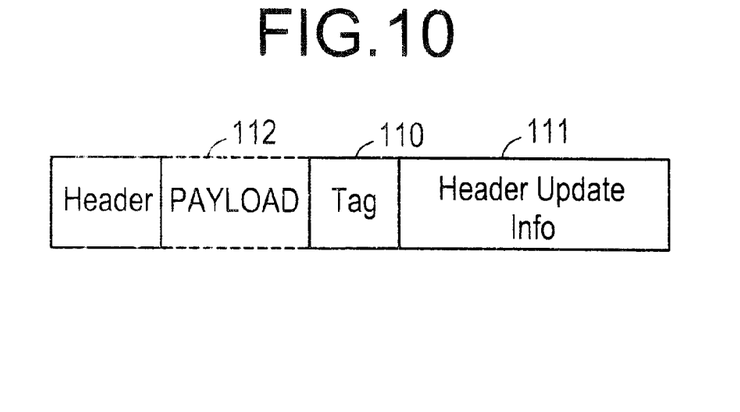
FIG. 10 illustrates an exemplary packet which can be used in conjunction with the bit stealing scheme of FIG. 7.

FIG. 10 illustrates one example of a packet which can be used to transmit the header update information when using the inventive technique of stealing payload bits and using them to transmit the header update information. The packet of FIG. 10 includes a conventional header (compressed or not), a soft state update tag 110 and header update information 111. The tag 110 is provided so that a receiving communication station will recognize that the FIG. 10 packet includes header update information in addition to (or instead of) payload data. The example of FIG. 10 indicates in broken lines that a portion 112 of the payload, for example the most significant speech codec bits at 12 of FIG. 1, can be included in the packet along with the header update information 111.

The packet of FIG. 10 is also exemplary of a packet that can be used to transmit header update information according to the codec-related technique of FIG. 13. In this case, the entire payload can be included at 112, because the threshold TH for the lowered codec bit rate can be set as needed to permit the header update information 111 to be added (inserted) without stealing any payload (i.e., source encoded data) bits.

Figure 11:
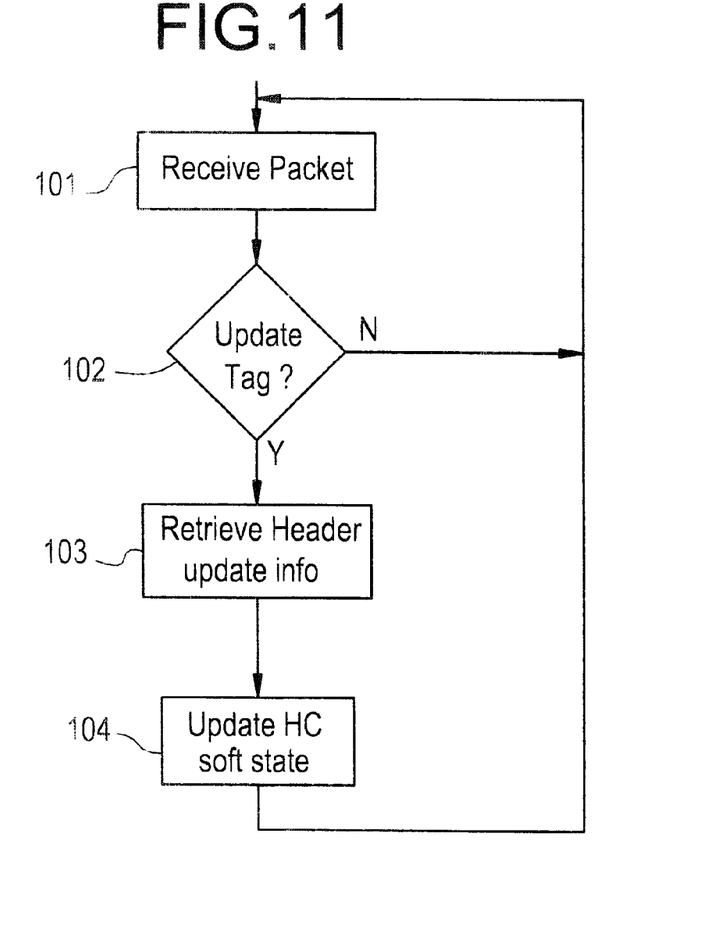
FIG. 11 illustrates exemplary operations which can be performed in support of HC soft update when receiving packets according to the invention.

FIG. 11 illustrates exemplary operations which can be performed according to the present invention in support of HC soft state update when packets are received. After a packet is received at 101, it is determined at 103 whether or not the packet includes a soft state update tag (for example at 91 in FIG. 9 or 110 in FIG. 10). If not, there is no HC soft state update. If so, then the header update information (see 93 in FIG. 9 or 111 in FIG. 10) is retrieved at 104 and used at 105 to perform the HC soft state update.

Figure 12:
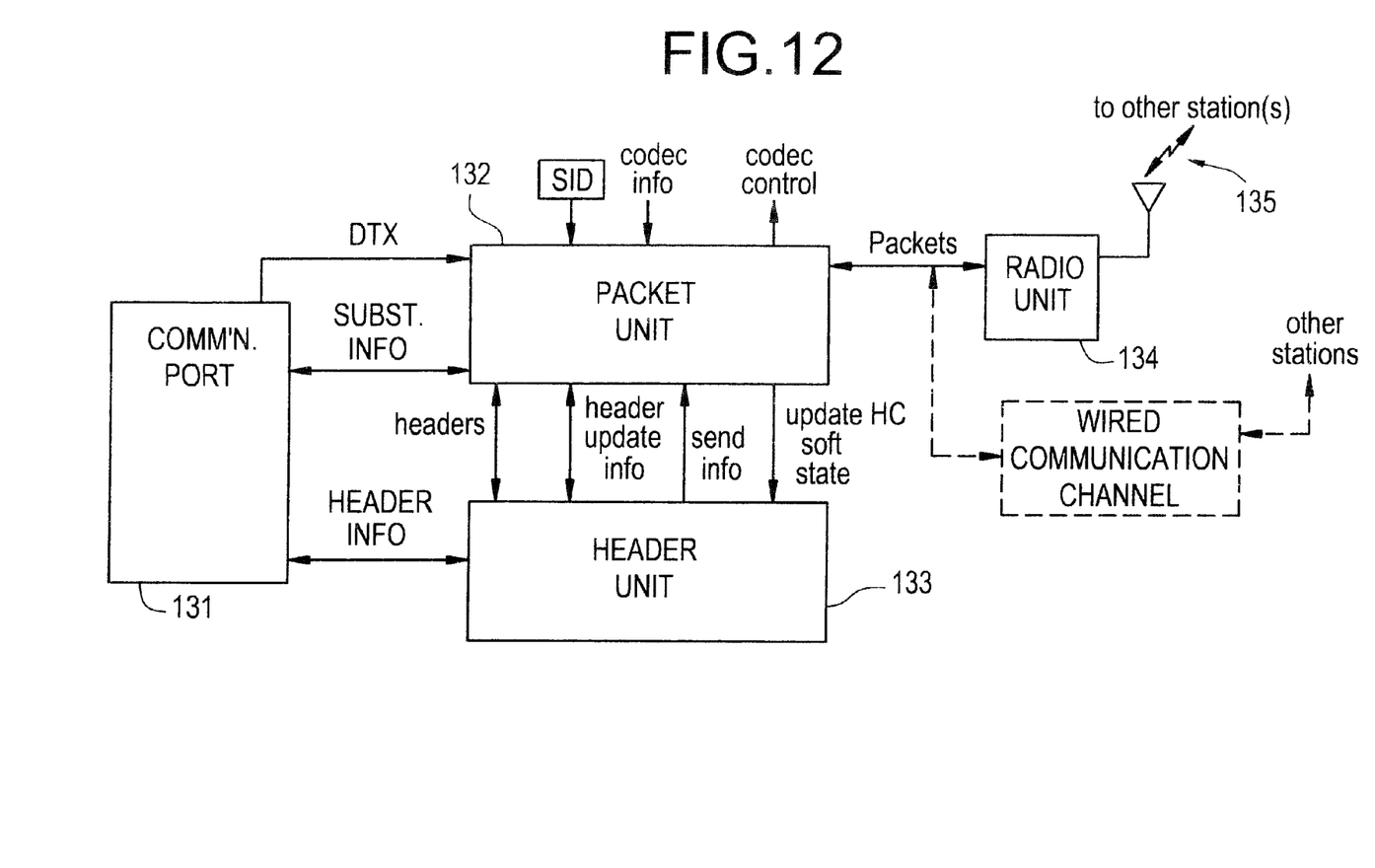
FIG. 12 illustrates pertinent portions of an exemplary communication station according to the invention.

FIG. 12 illustrates pertinent portions of exemplary embodiments of a communication station according to the invention, capable of performing the exemplary operations described above with respect to FIGS. 1–11 and 13. The exemplary communication station of FIG. 12 can be a wireless station, for example, a mobile radio transceiver such as a cellular telephone, or a fixed-site radio transceiver. The communication station of FIG. 12 can also be a wireline communication station for use with wired channels, for example a video conferencing host.

The communication station of FIG. 12 includes a communication port 131 for providing substantive information (for example speech or video information) to a packet unit 132, and for receiving substantive information from the packet unit 132. The communication port 131 also provides header information to a header unit 133. The header unit 133 can use conventional techniques to produce headers (compressed or not) from the header information provided by communication port 131. The header unit 133 provides outgoing headers to the packet unit 132, and also receives incoming headers from the packet unit 132.

The packet unit 132 is operable conventionally to assemble the header bits received from header unit 133 and the substantive information bits (i.e., payload bits) received from communication port 131 to form an outgoing packet, for example as illustrated in FIG. 1. The packet unit 132 can forward the assembled packet to a radio unit 134 which transmits the packet over a radio link 135. In other embodiments (e.g. a video conferencing host) the packet unit 132 can output packets to a wired communication channel (e.g. a data network such as the Internet) as shown in broken lines. The outgoing packets in FIG. 12 can be received by a receiving station (not shown) which can, for example, have structure and functionality analogous to the communication station of FIG. 12.

The packet unit 132 also receives from the radio unit 134 incoming packets received by the radio unit over the radio link 135. The packet unit 132 conventionally disassembles the incoming packets and provides the substantive information from each incoming packet to the communication port 131 for conventional use. The packet unit also provides the headers from the incoming packets to the header unit 133, which decompresses them as necessary using conventional techniques, and then forwards the header information to the communication port 131.

The packet unit 132 can also receive from the communication port 131 a DTX indication (i.e., no speech activity) or a "static video" indication (i.e., no video activity), to which the packet unit 132 can respond by outputting packets including SID/"static image" frames as illustrated generally in FIGS. 2 and 3.

The packet unit can also communicate with a codec (not shown) to receive therefrom bit rate information and to provide thereto orders to lower/restore the bit rate, as described above with respect to FIG. 13.

The header unit 133 is coupled to exchange header update information with the packet unit 132, and to signal the packet unit 132 when it is desired to send header update information in an outgoing packet. In response to receiving a signal to send header update information in an outgoing packet, the packet unit 132 can perform the operations illustrated in FIGS. 6, 8 and 13, either individually or in combination as desired, as discussed above. A packet such as illustrated at FIG. 9 can be produced if DTX/"static video" operation is occurring, and a packet such as illustrated at FIG. 10 can be produced if DTX operation is not occurring.

When the communication station of FIG. 12 receives an incoming packet, it can perform the exemplary operations illustrated in FIG. 11. When the packet unit 132 detects an update tag such as illustrated at 91 in FIG. 9 or 110 in FIG. 10, the packet unit can retrieve the header update information, and provide this header update information to the header unit 133 along with a signal directing the header unit to update the HC soft state. If, for example, the header update information includes a full header, then the header unit can use the full header in conventional fashion to reset (i.e., update) its header compression state machine (not shown).

It will be evident to workers in the art that the invention described above can be implemented by suitable modifications in hardware, software or both in, for example, a packet communication portion of a conventional wireless or wireline communication station.

As seen from the foregoing discussion, the present invention provides the following exemplary advantages over the prior art: a continuous update of the header compression state may be realized within a constant bit rate channel in a resource efficient way; the time during which the header compression scheme is in a corrupt state is reduced in a resource efficient way; and the number of lost packets due to the corrupt header compression state is reduced, whereby the quality of real-time services is improved.

Although exemplary embodiments of the present invention have been described above in detail, this does not limit the scope of the invention, which can be practiced in a variety of embodiments.

What is claimed is:

1. A method of transmitting a communication signal from a first communication station to a second communication station, comprising:

during periods of communication signal activity, sending from the first station to the second station communication signal packets which include compressed header information and communication signal information;

the first station detecting an absence of communication signal activity;

responsive to the first station detecting an absence of communication signal activity, sending from the first station to the second station an update packet including header update information; and operating the second station to use the header update information to correct an error in previously sent compressed header information, and to interpret header information in subsequent communication signal packets sent from the first station to the second station.

2. The method of claim 1, wherein the communication signal includes one of a speech signal and a video signal.

3. The method of claim 2, wherein said update packet includes comfort noise information for creating at the second station an illusion of continuous transmission of sound.

4. The method of claim 2, wherein said update packet sending step includes sending the update packet instead of a packet including comfort noise information.

5. The method of claim 1, wherein said sending steps include sending the packets via a communication link including a wireless communication channel.

6. The method of claim 1, including the second station using the header update information to update a header compression state maintained in the second station.

7. The method of claim 1, including, during one of said periods of communication signal activity, the first station replacing at least some of the communication signal information in one of the packets with header update information.

8. A method of transmitting a communication signal from a first communication station to a second communication station, wherein said communication information includes source encoded data, said method comprising:

during periods of communication signal activity, sending from the first station to the second station communication signal packets which include header information and communication signal information; and during one of said periods of communication signal activity, the first station determining that a bit rate of a codec that produced the source encoded data is below a threshold level, and thereafter the first station inserting header update information in one of the packets without replacing any of the source encoded data.

9. The method of claim 8, wherein said determining step includes the first station ordering the codec to lower its bit rate below the threshold level.

10. A method of transmitting information from a first communication station to a second communication station, comprising:

the first station assembling packets which include header information and payload information, and sending the assembled packets from the first station to the second station;

said assembling step including the first station assembling an update packet, including replacing at least some payload information with header update information which can be used by the second station to interpret header information in subsequent packets sent from the first station to the second station; and said sending step including sending said update packet from the first station to the second station.

11. The method of claim 10, wherein said replacing step includes replacing all of the payload information with header update information.

12. A method of transmitting information from a first communication station to a second communication station, comprising:

the first station assembling packets which include header information and payload information, and sending the assembled packets from the first station to the second station; and said assembling step includes the first station assembling an update packet, including replacing a first portion of the payload information with header update information, and wherein said sending step includes sending the header update information in said update packet together with a second portion of the payload information from the first station to the second station.

13. The method of claim 12, wherein the second portion of the payload information is a relatively more important portion of the payload information than the first portion thereof.

14. The method of claim 12, wherein the payload information includes one of speech information and video information.

15. The method of claim 12, wherein said replacing step includes replacing at least some of the payload information with partial header update information which the second station can use to interpret a portion of the header information in subsequent packets.

16. The method of claim 15, including determining that an amount of payload information that is available to be replaced by header update information is insufficient to accommodate a desired amount of header update information, and said replacing step including replacing at least some of the payload information with the partial header update information in response to the determination of insufficient available payload information.

17. The method of claim 12, wherein said sending steps include sending the packets via a communication link including a wireless communication channel.

18. A communication apparatus for transmitting a communication signal to a second communication apparatus, comprising:

a packet unit having an input for receiving communication signal information during periods of communication signal activity, and having an output for sending to the second apparatus communication signal packets including communication signal information and compressed header information;

a header unit coupled to said packet unit for providing thereto said header information and also for providing thereto header update information which can be used by the second apparatus to correct an error in previously sent compressed header information and also to interpret header information in subsequent communication signal packets sent from said packet unit to the second apparatus; and said packet unit responsive to an absence of communication signal activity for sending from said output to the second apparatus an update packet including said header update information.

19. The apparatus of claim 18, wherein the communication signal includes one of a speech signal and a video signal.

20. The apparatus of claim 19, wherein said update packet includes comfort noise information for creating at the second apparatus an illusion of continuous transmission of sound.

21. The apparatus of claim 19, wherein said packet unit is operable to send said update packet instead of a packet including comfort noise information.

22. The apparatus of claim 19, wherein said packet unit is operable to send the packets via a communication link including a wireless communication channel.

23. A communication apparatus for transmitting information to a second communication apparatus, comprising:

a packet unit having an input for receiving payload information, and having an output for sending to the second apparatus packets including payload information and header information;

a header unit coupled to said packet unit for providing thereto said header information and also for providing thereto header update information which can be used by the second apparatus to interpret header information in subsequent packets sent from said packet unit to the second apparatus; and said packet unit operable, before sending one of said packets, to replace at least some of the payload information with the header update information.

24. The apparatus of claim 23, wherein said packet unit is operable to replace all of the payload information in said one packet with header update information.

25. A communication apparatus for transmitting information to a second communication apparatus, comprising:

a packet unit having an input for receiving payload information, and having an output for sending to the second apparatus packets including payload information and header information;

a header unit coupled to said packet unit for providing thereto said header information and also for providing thereto header update information which can be used by the second apparatus to interpret header information in subsequent packets sent from said packet unit to the second apparatus; and said packet unit operable, before sending one of said packets, to replace a first portion of the payload information of said one packet with header update information, and to send the header update information in said one packet together with a second portion of the payload information.

26. The apparatus of claim 25, wherein the second portion of the payload information is a relatively more important portion of the payload information than the first portion thereof.

27. The apparatus of claim 25, wherein the payload information includes one of speech information and video information.

28. The apparatus of claim 25, wherein said packet unit is operable to replace at least some of the payload information with partial header update information which the second station can use to interpret a portion of the header information in subsequent packets.

29. The apparatus of claim 25, wherein said packet unit is operable to send the packets via a communication link including a wireless communication channel.

30. A method of transmitting source encoded data from a first communication station to a second communication station, comprising:

the first station assembling source encoded data packets which include header information and source encoded data, and sending the assembled packets from the first station to the second station; and the first station determining that a bit rate of a codec that produced the source encoded data is below a threshold level, and thereafter assembling an update packet including header information, the source encoded data and header update information which can be used by the second station to interpret header information in subsequent source encoded data packets sent from the first station to the second station.

31. The method of claim 30, wherein the source encoded data includes one of speech data and video data.

32. The method of claim 30, wherein said determining step includes the first station ordering the codec to lower its bit rate below the threshold level.

33. A communication apparatus for transmitting source encoded data to a second communication apparatus, comprising:

a packet unit having an input for receiving source encoded data, and having an output for sending to the second apparatus source encoded data packets including source encoded data and header information;

a header unit coupled to said packet unit for providing thereto said header information and also for providing thereto header update information which can be used by the second apparatus to interpret header information in subsequent source encoded data packets sent from said packet unit to the second apparatus; and said packet unit having an input for receiving information indicating that a bit rate of a codec that produced the source encoded data is below a threshold level, said packet unit responsive to said information for inserting the header update information in one of said source encoded data packets together with the header information and the source encoded data.

34. The apparatus of claim 33, wherein the source encoded data includes one of speech data and video data.

35. The apparatus of claim 33, wherein said packet unit includes an output for ordering the codec to lower its bit rate below the threshold level.

* * * * *